United States Patent
Nishimura et al.

[15] 3,661,651
[45] May 9, 1972

[54] NON-SPILLABLE STORAGE BATTERY

[72] Inventors: Motoharu Nishimura; Toshihiro Isoi, Takatsuki, both of Japan

[73] Assignee: Yuasa Battery Company Limited, Osaka, Japan

[22] Filed: Apr. 22, 1970

[21] Appl. No.: 30,827

[30] Foreign Application Priority Data

Jan. 27, 1970 Japan.....................................45/7601

[52] U.S. Cl..............................................136/170, 136/177
[51] Int. Cl. .........................................................H01m 1/02
[58] Field of Search ..................................136/166, 170, 177

[56] References Cited

UNITED STATES PATENTS

| | | | |
|---|---|---|---|
| 2,646,459 | 7/1953 | Gill | 136/177 |
| 2,021,288 | 11/1935 | Carlile | 136/170 |
| 1,376,923 | 5/1921 | Dean | 136/177 |

FOREIGN PATENTS OR APPLICATIONS

| | | | |
|---|---|---|---|
| 849,864 | 9/1952 | Germany | 136/166 |
| 1,525 | 1915 | Great Britain | 136/177 |
| 315,571 | 7/1929 | Great Britain | 136/177 |
| 760,823 | 11/1956 | Great Britain | 136/166 |

*Primary Examiner*—Donald L. Walton
*Attorney*—Watson, Cole, Grindle & Watson

[57] ABSTRACT

This invention relates to a non-spillable battery in which at least three covers, namely, first, second and third covers from the battery container side are mounted in multiple stages on one battery container, said first and second covers are respectively provided with vent tubes in the manner that the tubes depend toward the container side so as not to bring the tubes of both covers into alignment with each other, said third cover being provided with an exhaust passageway communicating with vent openings, said passageway being provided at one end with a small vent tube having a port to communicate with the atmosphere.

3 Claims, 4 Drawing Figures

Patented May 9, 1972

3,661,651

INVENTOR
Motoharu Nishimura
Toshihiro Isoi
BY
Watson, Cole, Grindle & Watson
ATTORNEY

NON-SPILLABLE STORAGE BATTERY

This invention relates to a non-spillable storage battery that is free from leakage of liquid electrolyte when it is upset.

Heretofore, it has been proposed in the production of a storage battery of this type to employ the construction in which the inside of the battery is divided into three parts in the form of a battery chamber, gas chamber and exhaust chamber and in which the exhaust chamber provided in said gas chamber comprises a lateral tube opened at both ends thereof and having the upper surface thereof perforated, a longitudinal tube communicating with the outside, and a cylinder containing said longitudinal tube and supporting said lateral tube. However, this construction had the disadvantage that it made assembling difficult and was not always perfect as to the prevention of leakage of electrolyte when the use of the battery was considered in all its possible positions.

Accordingly, this invention is intended to provide a storage battery that has eliminated the disadvantages described above. The battery is of the construction in which several covers molded integrally and simple in construction are laid over a battery container and rigidly secured to the container. Particularly a cover body covering the container includes an upper cover, said upper cover having a series of exhaust passageways and a small opening communicating through an upper vent tube at one end of said series of exhaust passageways with the atmosphere. Intermediate covers are provided each having a partition wall and an intermediate vent tube corresponding to each cell and a lower cover having a lower vent tube provided for each cell, and are disposed so as not to bring said respective vent tubes into alignment with each other.

A primary object of this invention is to provide a storage battery that is free from the leakage of electrolyte when it is upset.

Another object of the invention is to provide a storage battery that is convenient for cleaning by having a simple external construction.

Yet another object of the invention is to provide a storage battery that requires no refilling of water during use and is thus simplified in maintenance and handling of the battery.

Other objects and advantages and a fuller understanding of the invention may be had by referring to the following description and claims taken in conjunction with the accompanying drawing in which:

Figure 1:
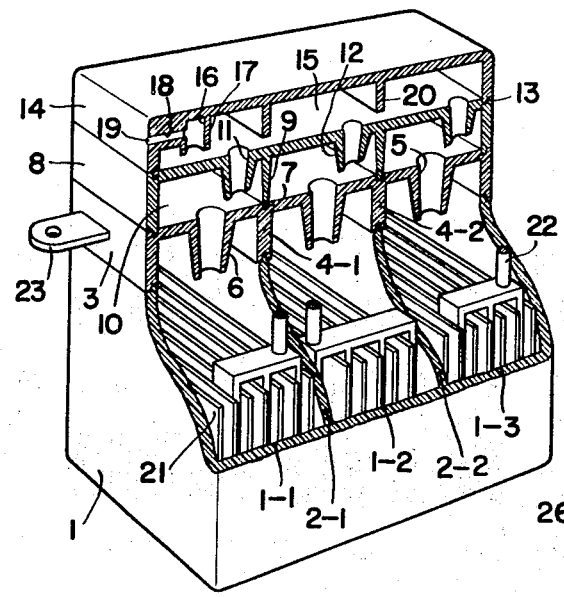
FIG. 1 is a perspective view, broken in part, of a storage battery of the invention in one preferred form.

With reference to the drawing, a battery container 1 is a monoblock container made up of three unit cells 1—1, 1-2, 1-3, partitioned by partition walls 2-1, 2—2, said cells being integrally molded of corrosion resisting and electrically insulating material such as plastic, and a first cover 3 having partition walls 4-1, 4-2 formed thereon is placed on said battery container 1 and bonded thereto on the adjoining portions. The first cover 3 is made of the same material as the container 1 and is disposed in such a manner that the partition walls 4-1, 4-2 are fitted over and bonded to the partition walls 2-1, 2—2 of said container 1 so as to form each cell. Since the three cells to be described hereinafter have numerous similar portions in common, a description will be made below with reference to only one cell. The first cover 3 is provided with a vent tube 6 having one vent opening 5, said vent tube extending inwardly from a fitting surface to the side of an electric group receiving chamber. On the top surface of this cover is formed a groove 7. On the first cover 3 is disposed a second cover 8 having a partition wall 9. There are formed the same number of chambers 10 as that of cells by the end of the partition wall 9 being fitted into the groove 7 of the first cover. The second cover 8 is provided with a small vent tube 12 having one vent opening 11, said vent tube 12 being formed on the cover 8 in the manner that the small vent tube 12 depends into the chamber 10 of the second cover 8. A groove 13 is formed on the four circumferential edges of the second cover 8, and the four circumferential edges of a third cover 14 are fitted into the groove 13 and bonded thereto. From this cover 14 there is depending into the chamber 10 a small vent tube 17 having a vent opening 16 at one end of an exhaust passageway 15 that communicates with the vent opening of each cell, and is brought into communication with a small side opening 19 extending through a conducting opening 18 from the vent opening 16. This cover 14 is provided inside with the same number of chambers as cells by partition walls 20. It is important to note in this connection that the partition walls 20 are not in contact with the second cover below but have clearance left between the walls 20 and the second cover. It is of further importance to note that the vent tubes formed on the first, second, and third covers are disposed so as not to be in alignment with each other. An electrode group 21 is placed in each cell before the first cover 3 is placed on the container 1. The electrode group 21 is made up of a lead dioxide positive plate, a lead negative plate, and a separator. After the first cover has been secured to each cell holding the electrode group, a necessary amount of sulfuric acid electrolyte is poured through the vent opening of each cell and then the second and third covers are mounted one after the other. The storage battery made in this manner has no filler opening, and accordingly has a simplified outer construction. The numeral 22 designates poles of the electrode group and 23 terminals for connection to associated equipment.

As a method of pouring the electrolyte into each cell there is another method besides the method described above by which the electrolyte is poured after the first cover was secured to the container. According to this other method, assembling of a storage battery is completed by putting plates in the container, securing the first, second and third covers to the container, a necessary amount of sulfuric acid electrolyte is poured through an opening formed beforehand on the side of the container 1 so as to communicate with each cell, and thereafter said opening is airtightly sealed by putting a plug made of the same material as the container on the opening and adhering or welding it, for example, by supersonic wave welding techniques. This method is more effective in that operation in a manufacturing step is simplified and the process of manufacture is simplified.

Figure 3:
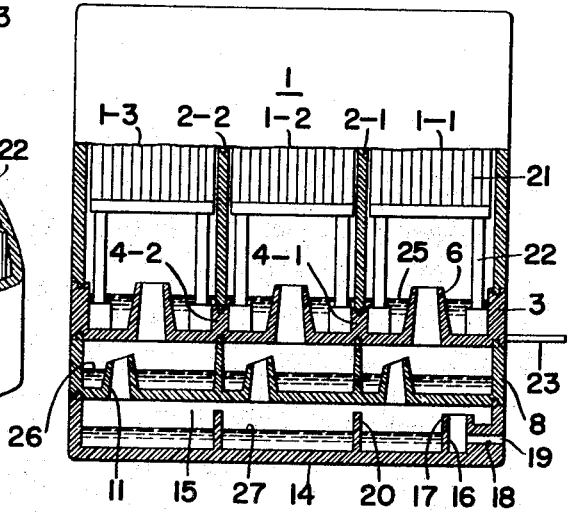
FIG. 3 is a front elevation, partly in section, of the storage battery of the invention shown in its fallen and raised positions.
Figure 2:
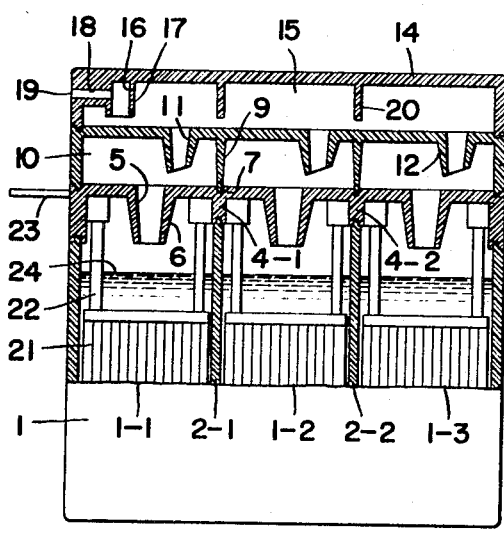
FIG. 2 is a front elevation, partly in longitudinal section, showing the storage battery of the invention.

Now, a description will be given of the principle of an electrolyte leakproof construction according to the invention. When the storage battery is in normal vertical position as shown in FIG. 2, the gas generated in the battery flows through the vent openings 5 of the vent tubes 6 into the chamber 10 of the second cover 8, then through the vent opening 11 of the small vent tube 12 and is collected in the exhaust passageway 15. The gas thus collected in the passageway 15 passes through a vent opening 16 of a small vent tube 17 and is discharged through the small side opening 19 into the atmosphere. Also, the lengths of the tubes 6 and the amount of electrolyte are beforehand adjusted so as to make electrolyte surface 24 lower than the vent tubes 6. Even if the battery of the described type should be upset by mistake while being carried, or has to be turned upside down while being incorporated into various machines and appliances, it is designed to make an electrolyte surface 25 always lower in position than the ends of the vent tubes 6 as shown in FIG. 3, and normally there is no possibility of the electrolyte flowing into the tubes 6. Also, although not shown herein, the storage battery is designed to make the ends of the tubes higher in position than the electrolyte surface at any angle it will make on the way to its completely upset position. But should part of the electrolyte flow into the chambers 10 of the second cover 8 by jolting and shocks, the battery is designed to make the openings at the ends of the small vent tube 12 higher in position than the electrolyte surface 26. Also, said vent tubes 12 are designed not to be in alignment with the vent ports of the vent tubes 6, and accordingly even when the battery is upset, there is little or no possibility of the electrolyte flowing into the exhaust passageway 15 of the third cover 14. But the level of the electrolyte surface 27 was calculated and fixed on the supposition that the electrolyte flowed into the exhaust passageway 15. In this case, even if the electrolyte should have flowed into the passageway 15, it would be very small in quantity by the effects of the vent tubes and the small vent tube and is always lower in position than the end of the small vent tube 17, and accordingly there is little or no possibility of the electrolyte leaking outside of the battery. The gas generated in the battery is freely discharged from the battery through the vent tubes always higher in position than the electrolyte. And when the battery is restored to its original position, the electrolyte that stayed in the chambers 10 and the passageway 15 flow back to its original position in the container.

Figure 4:
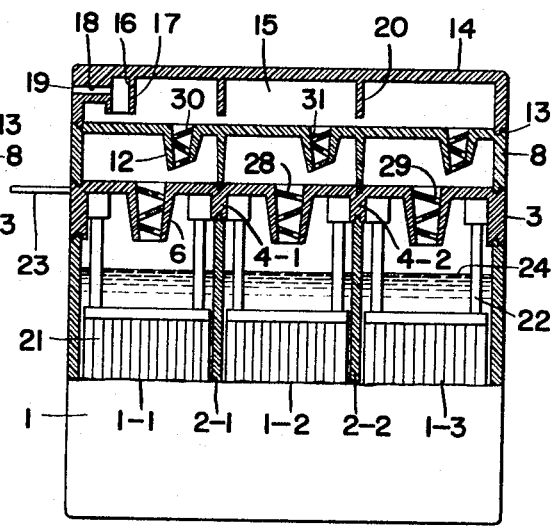
FIG. 4 is a front elevation, partly in section, of another embodiment of the invention.

FIG. 4 is a front elevation, partly broken, of a storage battery shown in one form of this invention. The characteristic features of this invention are that finlike baffle plates 28 are disposed in multiple stages in the tubes 6, said finlike baffle plates each having an inclined plane and an opening 29 in part of the bottom of the inclined plane, and the vent tubes 12 also are provided inside in the same manner as the tubes 6 with inclined baffle plates 30 having inclined openings 31, said openings 27 and 31 being designed to be more effective for the prevention of leakage by being positioned alternately with respect to each other in the multiple stages.

What is of particular importance in the battery of the invention is that the chambers formed in the second cover must be completely separated from each other by the partition walls. For this purpose, the partition walls are fitted into the grooves of the first cover and bonded thereto with an adhesive agent. The battery being of the construction described above, it provides no electric leakage due to common electrolyte even if the electrolyte should flow into the chambers because of the battery being upset. And the electrolyte that flowed into the chambers returns invariably to its original cell. This is very important for the performance of a storage battery. Furthermore, the chambers of the third cover are provided on the side with clearance, thereby making it possible to collect the exhaust gas of each cell at one place and to discharge it through one small opening of one small vent tube. The partition walls are effective for collecting at several places the electrolyte that may remotely possibly flow out when the battery is upset and prevents it from being collected in large quantities at the opening of the small vent tube 17.

Furthermore, the important characteristic of the invention is that the battery of the invention requires no refilling of liquid. Conventionally, it has been a general practice to refill a storage battery with water because the water content of electrolyte is decreased by the generation of gas in the battery, but the use of a suitable charger in combination with the battery can check the decrease to a minimum.

Since this invention relates to a storage battery that is intended to check a decrease in the water content of electrolyte to a minimum in the manner described, it can provide a maintenance-free battery in which prior filling of the battery with a required quantity of electrolyte suitable for the battery can dispense with refilling of water and thus simplify both the handling and the maintenance of the battery. Also, the formation of a small vent opening on the side of the battery with no filler cap formed on the outside can provide not only a construction simple in external shape and smooth on the top surface but also save the trouble of operating the filler cap for refilling and eliminate possibility of the leakage of liquid caused by insufficient closing of the filler cap. In addition thereto, as the battery is simple in construction, it facilitates cleaning and mounting on the machines and appliances on which it is mounted.

The storage battery provided by the invention is most suitable for use as a power source of cordless movable machines and appliances in which portability is highly valued. Although the invention has been described in one form with reference to a lead battery, it should of course be understood that the invention is applicable to an alkali battery such as a nickel-cadmium battery in which an alkaline electrolyte is used. Also, the third cover in the embodiment of the invention has been shown and described as having one small vent tube, but it may have a plurality of small vent tubes in proportion to the number of cells and the amount of gas produced. In addition, the embodiment illustrated has been described with reference to a monoblock battery in which several cells are shaped integrally but the invention can of course be applied to a battery having only one unit cell.

It should be noted that embodiments and modifications of this invention described are merely a few of actual applications possible, and it should be obvious that a number of other modifications are possible in the scope not deviating from the spirit of the invention.

What is claimed is:

1. A non-spillable multi-cell battery having an electrode group and an electrolyte held in a battery container, comprising:
    a first cover secured to said container, said cover including first vent tubes having vent openings formed therein, said first vent tubes extending from said cover toward the surface of said electrolyte so that said openings are higher than the electrolyte surface when the battery is upset, a second cover secured to said first cover and including partition walls forming the same number of chambers as battery cells, said chambers are isolated from one another and each including second vent tubes, said second vent tubes extending inwardly from said second cover in non-aligned relationship with said first vent tubes, a third cover mounted on said second cover and including an exhaust gas passageway communicating with said second vent tubes, said third cover further including a port in the side thereof and a third vent tube extending from said third cover in non-aligned relationship to said first and second vent tubes and interconnecting said passageway and said port.

2. A non-spillable battery according to claim 1 wherein said third cover includes additional partitions extending toward and spaced from said second cover, the spacing between said additional partitions and said second cover forming part of said passageway.

3. A non-spillable battery according to claim 1 wherein each of said first and second vent tubes include inclined baffle plates mounted therein, each of said baffle plates having an opening therein.

* * * * *